United States Patent
Götz (10) Patent No.: US 10,454,331 B2
(45) Date of Patent: Oct. 22, 2019

(54) CONVERTER, ELECTRICAL POLYPHASE SYSTEM AND METHOD

(71) Applicant: Dr. Ing. h.c. F. Porsche Aktiengesellschaft, Stuttgart (DE)

(72) Inventor: Stefan Götz, Forstern (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 72 days.

(21) Appl. No.: 15/368,788

(22) Filed: Dec. 5, 2016

(65) Prior Publication Data

US 2017/0163115 A1    Jun. 8, 2017

(30) Foreign Application Priority Data

Dec. 7, 2015   (DE) .......................... 10 2015 121 226

(51) Int. Cl.
*H02K 3/28* (2006.01)
*H02K 17/12* (2006.01)
(Continued)

(52) U.S. Cl.
CPC .............. *H02K 3/28* (2013.01); *H02K 11/33* (2016.01); *H02K 17/12* (2013.01); *H02M 7/49* (2013.01);
(Continued)

(58) Field of Classification Search
CPC ........... H02K 17/12; H02K 3/28; H02P 27/06
See application file for complete search history.

(56) References Cited

U.S. PATENT DOCUMENTS 6,075,350 A    6/2000 Peng
6,449,181 B1   9/2002 Rieger et al.
(Continued)

FOREIGN PATENT DOCUMENTS

DE   102011107737 A1   1/2013
DE   102014110410 A1   1/2016
WO     2012072168 A2   6/2012

OTHER PUBLICATIONS

German Search Report for Application No. 10 2015 121 226.9, dated Jul. 7, 2017, 8 pages.
(Continued)

*Primary Examiner* — Muhammad S Islam
(74) *Attorney, Agent, or Firm* — RatnerPrestia (57) ABSTRACT

An electric machine has a multiplicity of windings having a first terminal and a second terminal. At least one node exists to which one of the two terminals of a respective winding from the multiplicity of windings is electrically connected. The corresponding other terminal of a respective winding from the multiplicity of windings is electrically connected to a phase terminal, and to a modular multilevel converter that has a multiplicity of individual modules that are connected up in series to form a ring. At least one tap can be arranged between two respective adjacent individual modules and provides a phase terminal to which the first or the second terminal of a winding from the multiplicity of windings of the electric machine is electrically connected. A number of taps of the modular multilevel converter corresponds exactly to a number of windings from the multiplicity of windings of the electric machine.

12 Claims, 6 Drawing Sheets

(51) Int. Cl.
    *H02P 27/06*     (2006.01)
    *H02M 7/49*      (2007.01)
    *H02K 11/33*     (2016.01)
    *H02P 25/22*     (2006.01)
    *H02P 27/14*     (2006.01)
    *H02M 7/483*     (2007.01)

(52) U.S. Cl.
    CPC .............. *H02P 25/22* (2013.01); *H02P 27/06* (2013.01); *H02P 27/14* (2013.01); *H02K 2213/12* (2013.01); *H02M 2007/4835* (2013.01)

(56) References Cited

U.S. PATENT DOCUMENTS

| | | | |
|---|---|---|---|
| 6,657,334 | B1 | 12/2003 | Edelson |
| 2004/0104700 | A1* | 6/2004 | Edelson .................. H02K 3/28 318/437 |
| 2007/0109823 | A1 | 5/2007 | Rastogi et al. |
| 2014/0049230 | A1 | 2/2014 | Weyh |
| 2014/0146586 | A1* | 5/2014 | Das ........................ H02M 1/36 363/49 |
| 2014/0167709 | A1 | 6/2014 | Baruschka |
| 2014/0218986 | A1* | 8/2014 | Hasler ...................... H02J 3/26 363/123 |
| 2015/0077069 | A2* | 3/2015 | Weyh .................... H02M 7/483 323/207 |
| 2015/0124506 | A1* | 5/2015 | Sahoo .................. H02M 5/225 363/126 |
| 2015/0188447 | A1* | 7/2015 | Jimichi ................. H02M 7/483 363/65 |
| 2016/0188447 | A1 | 7/2016 | Jimichi et al. |

OTHER PUBLICATIONS

Chinese Office Action for Chinese Application No. 201011101758X, dated Jul. 18, 2018, 7 pages.

Indian Examination Report for Indian Application No. 201614038954, dated Feb. 5, 2019 with translation, 5 pages.

* cited by examiner

CONVERTER, ELECTRICAL POLYPHASE SYSTEM AND METHOD

CROSS-REFERENCE TO RELATED APPLICATIONS

This application claims priority to German Patent Application No. 10 2015 121 226.9, filed Dec. 7, 2015, which is incorporated by reference herein in its entirety.

FIELD OF THE INVENTION

The invention relates to a modular multilevel converter, an electrical polyphase system and a method for operating an electrical polyphase system.

BACKGROUND OF THE INVENTION

Conventional batteries, whose application is meant to go beyond that of small electronics, are often constructed as hardwired units from a plurality of individual parts, such as cells, for example. At an output, such batteries deliver almost exclusively DC voltage. By contrast, most loads require an AC voltage, with, by way of example, a harmonic voltage profile having a particular frequency, amplitude and phase. Further, the DC voltage is not constant over the state of charge. In order to be able to operate the connected loads and draw the requisite power both at a peak and at an end-of-charge voltage, the loads need to use complex supply circuits. If the voltage required by a load is very different than the voltage provided by the battery, then the power-electronics circuit causes (as a result of what is known as the low modulation index) high losses and high distortions in the output voltage. This relates particularly to the drive of an electric vehicle, which, at low speeds, normally requires AC voltages having a much lower amplitude than the maximum amplitude. The distortions that normally arise as a result of pulse width modulation additionally load an insulation of the motor and therefore affect the life of the motor. On account of variation in the physical and chemical response of the individual battery parts, for example the cells, it is necessary to provide complex monitoring for the battery and, in particular, local charge interchange (what are known as battery management) in order to allow an even state of charge for all battery parts. If just one part of a battery is faulty, for example a cell, then normally the whole battery is unusable. In the case of a vehicle, complete failure of the vehicle must be expected. It may even be necessary for the vehicle or the battery to be actively forced to shut down so that the faulty battery part(s) do not overheat and catch fire when loaded further.

Electric drives in vehicles and also for electric power supply often use two-phase or three-phase AC voltage systems. In order to produce an AC voltage, inverters are used in order to produce the desired AC voltage. These systems, that is to say sources and loads, are normally designed either vis-à-vis a common symmetric reference point (star system) or differentially with respect to one another (delta system). In this case, the voltages arising are normally approximately sinusoidal. However, the number of phases, specifically in motors, defines how finely the circulating field and hence the torque can be controlled. Distortions that are produced by the iron teeth of a stator or a rotor of the electric motor, for example, can be compensated for only to a limited extent. A higher number of phases would have great advantages from the point of view of the motor. A higher number of phases can be produced with known inverters that always produce the voltage against the same reference points, but only with increased complexity.

Usually, three-phase AC motors are used today, in which the profile of the voltage on the three windings is normally offset by 120°. As a result, the windings have a differential voltage in relation to one another. By increasing the number of phases, it would be possible to reduce the differential voltages.

U.S. Pat. No. 6,657,334, which is incorporated by reference herein, describes a combination of an inverter and an electric asynchronous machine that each have more than three phases. In this case, the asynchronous machine has a multiplicity of windings, each winding having two terminals. Each terminal of a winding is individually connected to different phase terminals of the inverter. Each phase terminal of the inverter is connected to two terminals of two different windings of the asynchronous machine in this arrangement. Each winding is thus connected to two phase terminals of the inverter, there being an identical phase shift between the phase terminals.

SUMMARY OF THE INVENTION

Described herein is a system that can be used in a simple manner to produce a multiplicity of phases for an electric machine, a respective regulable voltage difference being providable between two respective adjacent phase terminals.

An electrical polyphase system has an electric machine and a modular multilevel converter, in which the electric machine has a multiplicity of windings each having a first terminal and a second terminal, wherein at least one node exists to which either the first terminal or the second terminal of a respective winding from the multiplicity of windings is electrically connected, and the corresponding other terminal of the first terminal and of the second terminal of a respective winding from the multiplicity of windings is electrically connected to a phase terminal, and the modular multilevel converter has a multiplicity of individual modules that are connected up in series to form a ring, and at least one tap can be arranged between two respective adjacent individual modules and provides a phase terminal to which the first terminal or the second terminal of a winding from the multiplicity of windings of the electric machine is electrically connected, wherein a number of taps of the modular multilevel converter corresponds exactly to a number of windings from the multiplicity of windings of the electric machine, and wherein the individual modules of the modular multilevel converter each have an energy store and a plurality of switching elements that allows energy stores of adjacent individual modules to be connected up, as a result of which a voltage difference that is regulable by a control unit in accordance with a profile of a polyphase rotating field can be provided between two adjacent phase terminals or two adjacent windings.

Further, a modular multilevel converter has a plurality of individual modules that each have a plurality of switching elements and at least one electrical energy store, wherein the individual modules are connected up in succession to form a closed ring.

An electric machine cooperates with a modular multilevel converter, a macrotopology of the modular multilevel converter being a loop, that is to say the individual modules of the modular multilevel converter are connected up to one another to form a loop. By adding a tap between two adjacent individual modules, it is possible to produce new phase terminals to which windings of the electric machine are connectable. Hence, it is likewise possible to increase the number of phases or the number of windings of the electric machine, since there are now more phase terminals available. An advantage of a polyphase motor is lower torque ripple. Furthermore, a circulating AC field or rotating field produced in this manner can be controlled more finely, which also results in finer controllability for the relevant motor. Additionally, failsafety is increased and an emergency mode can reliably be provided that allows a return home or a trip to a workshop with the vehicle. If an individual phase fails completely, for example, this does not automatically result in complete system failure. The ripple in the torque also increases only insignificantly and the remaining motor power is almost unimpaired.

In one embodiment of the modular multilevel converter, at least one tap is arranged between two respective adjacent individual modules and provides a phase terminal, at least two individual modules that form a phase module being arranged between two adjacent taps.

In a further embodiment of the modular multilevel converter, the individual modules have a first side and a second side, the first side having two terminals and the second side having two terminals.

In yet a further embodiment of the modular multilevel converter, the individual modules are each electrically connected to one another by means of two electrical conductors.

In one embodiment of the modular multilevel converter, the tap for providing a phase terminal is arranged on one of the two electrical conductors.

In a further embodiment of the modular multilevel converter, the tap for providing a phase terminal is arranged on both electrical conductors.

In yet a further embodiment of the modular multilevel converter, the modular multilevel converter has a phase module comprising at least two individual modules that branches off from the ring arrangement and that has one end connected to a tap and has the other end connected to a reference potential.

In one embodiment of the electrical modular multilevel converter, at least one tap is connected to a reference potential via an electrical connection that has at least one electrical resistance and/or an inductance.

In a further embodiment of the modular multilevel converter, multiple taps are connected to a reference potential via one electrical connection each that has at least one electrical resistance and/or an inductance, the multiple taps dividing the ring of the individual modules symmetrically.

In yet a further embodiment of the modular multilevel converter, the switching elements of the multiplicity of individual modules are low-voltage semiconductor switching elements.

In one embodiment of the electrical polyphase system, the electric machine operates as a generator.

In a further embodiment of the electrical polyphase system, the electric machine operates as a motor.

Further, the present invention proposes a method for operating an electrical polyphase system in which an electric machine and a modular multilevel converter are used, wherein the electric machine has a multiplicity of windings having a first terminal and a second terminal, and either the first terminal or the second terminal of a respective winding from the multiplicity of windings is connected to a node, and the corresponding other terminal from the first and second terminal of a respective winding from the multiplicity of windings is connected to a phase terminal, and wherein the modular multilevel converter has a multiplicity of individual modules that are connected up in series to form a ring, wherein at least one tap is arranged between two respective adjacent individual modules and provides a phase terminal to which the first or the second terminal of a winding from the multiplicity of windings of the electric machine is electrically connected, the individual modules of the modular multilevel converter each having an energy store and a plurality of switching elements that allows energy stores of adjacent individual modules to be connected up, as a result of which a voltage difference that is regulated by a control unit in accordance with a profile of a polyphase rotating field is provided between two adjacent phase terminals or two adjacent windings.

In one embodiment of the method, at least two individual modules that form a phase module are arranged between two taps.

In a further embodiment of the method, the individual modules used are individual modules that have a first side and a second side, the first side having two terminals and the second side having two terminals.

In yet a further embodiment of the method, the individual modules are each electrically connected to one another by means of two electrical conductors.

In one embodiment of the method, the tap for providing a phase terminal is arranged on one of the two electrical conductors.

In a further embodiment of the method, the tap for providing a phase terminal is arranged on both electrical conductors.

In yet a further embodiment of the method, the converter has a phase module arranged on it that branches off from the ring arrangement and that has one end connected to a tap and has the other end connected to a reference potential.

In one embodiment of the method, at least one tap is connected to a reference potential via an electrical connection that has at least one electrical resistance and/or an inductance.

In a further embodiment of the method, multiple taps are connected to a reference potential via an electrical connection that has at least one electrical resistance and/or an inductance, the multiple taps dividing the ring of the individual modules symmetrically.

In yet a further embodiment of the method, the switching elements used from the multiplicity of individual modules are low-voltage semiconductor switching elements.

In one embodiment of the method, the electric machine operates as a generator.

In a further embodiment of the method, the electric machine operates as a motor.

Further advantages and refinements of the invention are obtained from the description and the accompanying drawings.

It goes without saying that the features cited above and those yet to be explained below can be used not only in the respectively indicated combination but also in other combinations or on their own without departing from the scope of the present invention.

BRIEF DESCRIPTION OF THE DRAWING

The invention is schematically illustrated in the drawing on the basis of embodiments and is described schematically and in detail with reference to the drawing.

DETAILED DESCRIPTION OF THE INVENTION

Electric vehicles of the prior art provide an AC voltage that is necessary for the operation of the electric motor by using inverters that convert a DC voltage provided by a DC voltage source into the required AC voltage. Often, a three-phase alternating current is needed for electric motors, i.e. the electric motor has three windings, the profile of the respective voltages in the individual windings being phase-shifted through 120° when the windings are arranged at regular intervals on a circle.

The number of phases of an electric machine is increased by increasing the number of windings of the electric machine. Depending on how many phases the electric machine is meant to have, the electric machine has a corresponding number of windings. Each winding is thus associated with one phase. The multiplicity of windings are normally meant to be distributed evenly over a circumference of a circle, which produces an even phase angle between the profiles of the voltages of the individual windings.

The windings may be connected up to one another in different ways. One option is what is known as a star circuit. In a star circuit, one terminal of each of the individual windings is electrically connected up to a common node of all the windings, what is known as the start point. When the windings are distributed regularly on the circle, the voltage at the star point is zero, which means that a neutral conductor is connectable to the star point. The corresponding other terminal of a winding is connected to a phase terminal and has a voltage that is increased in comparison with the star point.

Figure 1:
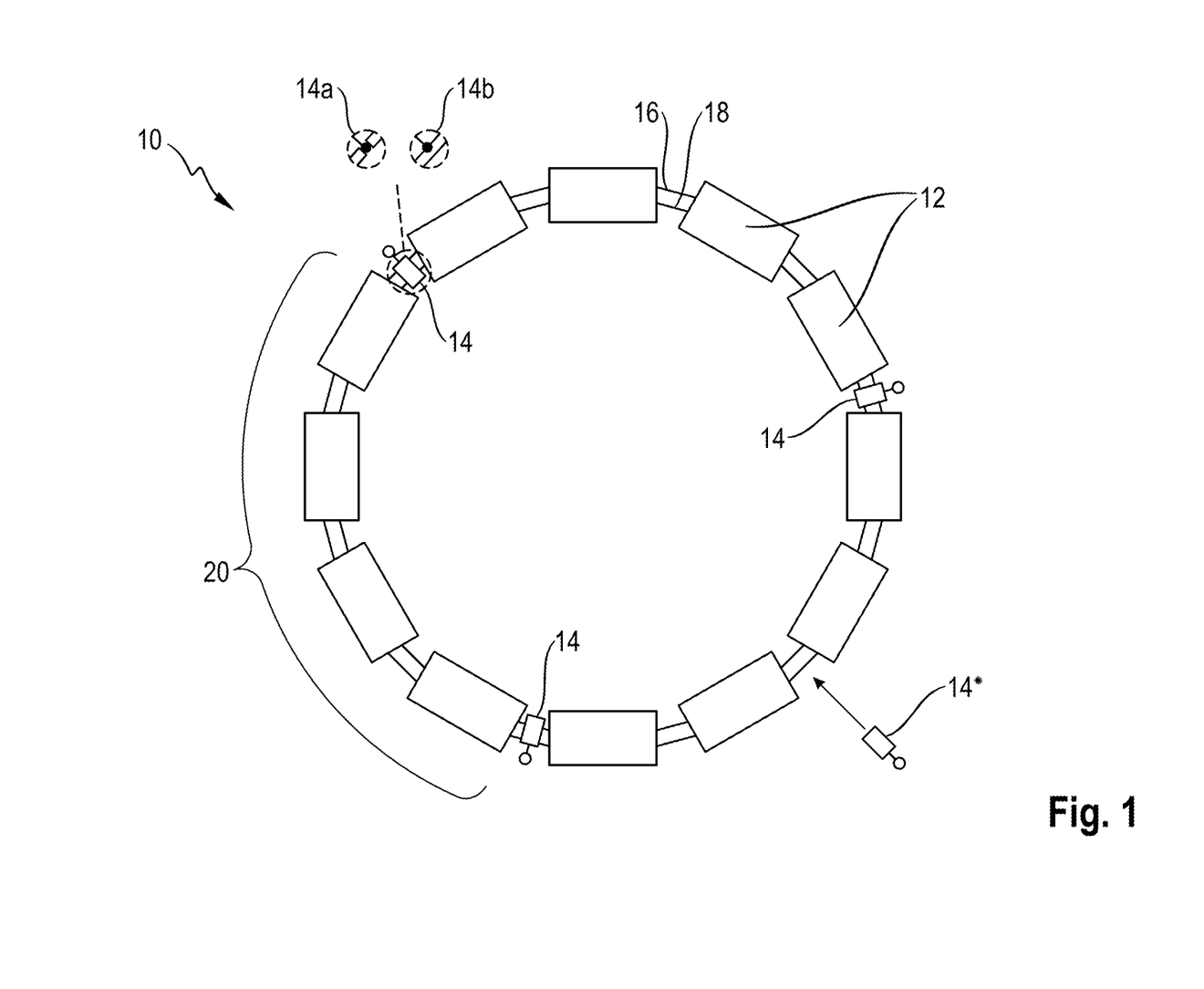
FIG. 1 shows a schematic view of an exemplary macro-topology of a usable modular multilevel converter in which individual modules are connected up to one another to form a ring.

The phase terminal is provided by a converter. FIG. 1 illustrates a schematic circuit diagram for a converter 10, what is known as a modular multilevel converter 10. The modular multilevel converter 10 has a multiplicity of individual modules 12. The individual modules 12 may themselves have an arbitrary topology, what is known as a microtopology, which usually consists of a plurality of switching elements and at least one electrical energy store each, for example a capacitor or a battery cell.

Figure 3:
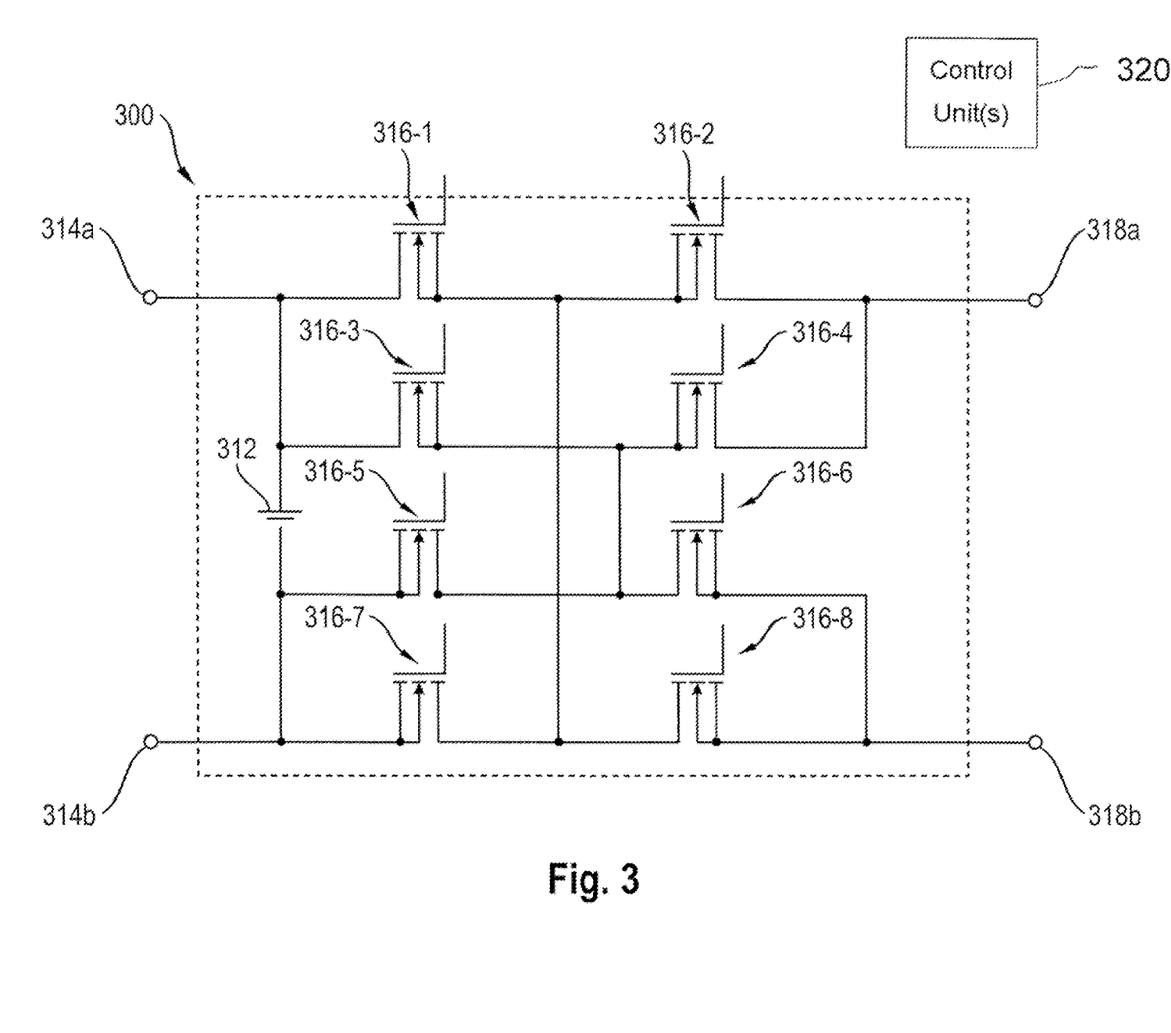
FIG. 3 shows an embodiment of an exemplary individual module for use in a modular multilevel converter from FIG. 1 or FIG. 2.

An exemplary individual module 300 and a control unit 302 are shown in FIG. 3. The exemplary individual module 300 has two sides that each have two terminals. Arranged on a first side are the terminals 314a and 314b. Arranged on a second side are the terminals 318a and 318b. In the embodiment shown, the exemplary individual module 300 has eight switching elements 316-1, 316-2, 316-3, 316-4, 316-5, 316-6, 316-7, 316-8. The switching elements 316-1, 316-2, 316-3, 316-4, 316-5, 316-6, 316-7, 316-8 are controlled by control unit 302 (e.g., via gates of the switching elements). Connection lines between the control unit 302 and the switching elements are not shown for clarity of illustration.

Hence, for electrical connection of the terminals 314a, 314b to the terminals 318a, 318b, two respective load paths are available for each connection, that is to say 314a-318a, 314a-318b, 314b-318a and 314b-318b. This allows the switching elements 316-1 to 316-8 to be designed for a lower current-carrying capacity. Hence, it is also possible to use low voltage switching elements or low voltage semiconductor switching elements for the switch elements, because the maximum voltage for which the switching elements 316-1 to 316-8 need to be designed is markedly below the total voltage of the system, namely just at the maximum voltage of the electrical energy store 312 of an individual module with which the switching elements 316-1 to 316-8 are associated, for example. The electrical energy store 312 may be a capacitor of any type or an individual battery cell or multiple battery cells (for example a small battery pack). It is intended to be understood that the battery used may be, by way of example, primary cells, secondary cells or energy sources and energy stores, which merely provide a DC voltage.

The switching elements shown in FIG. 3 allow two parallel paths for almost all connections between the energy store 312 and a corresponding energy store of an adjacent individual module of the same type. The switching elements are used in parallel as appropriate. However, switching elements can be eliminated in order to reduce complexity. The remaining switching elements should then be implemented with correspondingly larger semiconductors, if semiconductor switching elements are used, however, in order to allow the same current-carrying capacity. An appropriate choice of semiconductors allows particular switching states to be optimized in terms of their losses in comparison with others.

As such, the switching elements 316-1 and 316-2 form a path that is parallel to the path formed by the switching elements 316-3 and 316-4 and leads to the same destination, i.e. to the terminal 314a or to the terminal 318a, depending on the direction. The switching elements 316-5 and 316-4 form a path that leads to the same destination as the path formed by the switching elements 316-7 and 316-2, namely to the terminal 314b or to the terminal 318a, depending on the direction. The switching elements 316-1 and 316-8 form a path that leads to the same destination as the path formed by the switching elements 316-3 and 316-6. Further, the switching elements 316-7 and 316-8 form a path that is parallel to the path formed by the switching elements 316-5 and 316-6 and leads to the same destination, namely to the terminal 314b or 318b, depending on the direction.

An elimination can now involve an arbitrary switching element being removed. However, a second switching element to be eliminated should be chosen such that a connection can still be made from any terminal to any other terminal via the remaining switching elements. This results in a series of reduced circuits.

It is intended to be understood that not only the exemplary individual module 300 shown can be used as an individual module 12 of the modular multilevel converter 10, but rather the individual modules 12 may have any desired known topology from the prior art.

Modular multilevel converters 10 equipped with such an individual module 12, 300 have hitherto been able to be used to split hardwired battery packs into individual parts or individual modules 12, 300 such that an electrical interconnection of the individual parts 12, 300, that is to say of the energy stores of adjacent individual modules, can be altered dynamically during operation. The energy stores of adjacent individual modules can change over between parallel connection, series connection, bypass connection and disconnection of individual or multiple individual modules. This allows a charge interchange between the individual modules or energy stores to be used to perform conventional battery management, for example, in order to load the energy stores evenly. In addition, faulty individual modules 12 can be bypassed without losing overall operation. In particular, arbitrary output voltages and temporal current and voltage profiles on the terminals, for example 314a, 314b, 318a, 318b, can be produced directly by the individual modules without requiring an additional power-electronics converter.

The individual modules 12 have, as can be seen in FIG. 1, their terminals, such as the terminals 314a, 314b, 318a, 318b of the individual module of FIG. 3, for example, electrically connected to an adjacent individual module 12 via two electrical conductors 16 and 18, the individual modules 12 are arranged in a loop, so that an n-th individual module 12 is electrically connected to a first individual module 12. In order to be able to tap off the current and voltage profiles produced by the individual modules 12, two adjacent individual modules 12 have a tap 14 arranged between them that provides a phase terminal for the second terminals of the windings of the electric machine. Initially, FIG. 1 shows three such taps 14. Simple addition of an additional tap 14\* allows an additional phase terminal to be provided, as illustrated by the arrow in FIG. 1. Such a converter or modular multilevel converter 10 having individual modules 10 arranged in a loop can now be equipped with an arbitrary number of phase terminals (depending on how many individual modules 12 are present, the number of which can also be increased arbitrarily, however) in a simple manner. The terminals 14 can be implemented in different ways. By way of example, a terminal 14a may comprise both electrical conductors 16, 18 and be connected thereto by virtue of the two electrical conductors 16, 18 being brought together. However, this means that parallel connection of adjacent energy stores of the individual modules is not possible. Alternatively, it would be possible to implement a terminal 14b that is connected only to one electrical conductor 16 or 18. However, this means that the current loading for the switching elements that serve the respective electrical line is greater. Between two taps 14, the relevant individual modules form a phase module 20.

Such an arrangement of the individual modules 12 in the modular multilevel converter 10 means that dynamic reconfiguration can directly produce the AC voltage and the multiphase voltage for one or more loads, such as an electric machine that operates as a motor, for example. In contrast to converters of the prior art, it is possible for a modulation index, i.e. a characteristic value for a relevant frequency modulation, to be kept at a maximum for all amplitudes. Furthermore, at low voltages, even losses are reduced, because parallel connection of battery portions (that is to say of the respective energy stores) of a connected battery means that an effective internal resistance is reduced. In addition, a connected battery in which the energy stores can be switched to and fro between parallel connection and series connection produces an almost distortion-free output voltage, since steps between the voltages of two configurations can be kept very small. Furthermore, switching modulation can be used to modulate between such voltages in order to provide further smoothing.

Figure 4:
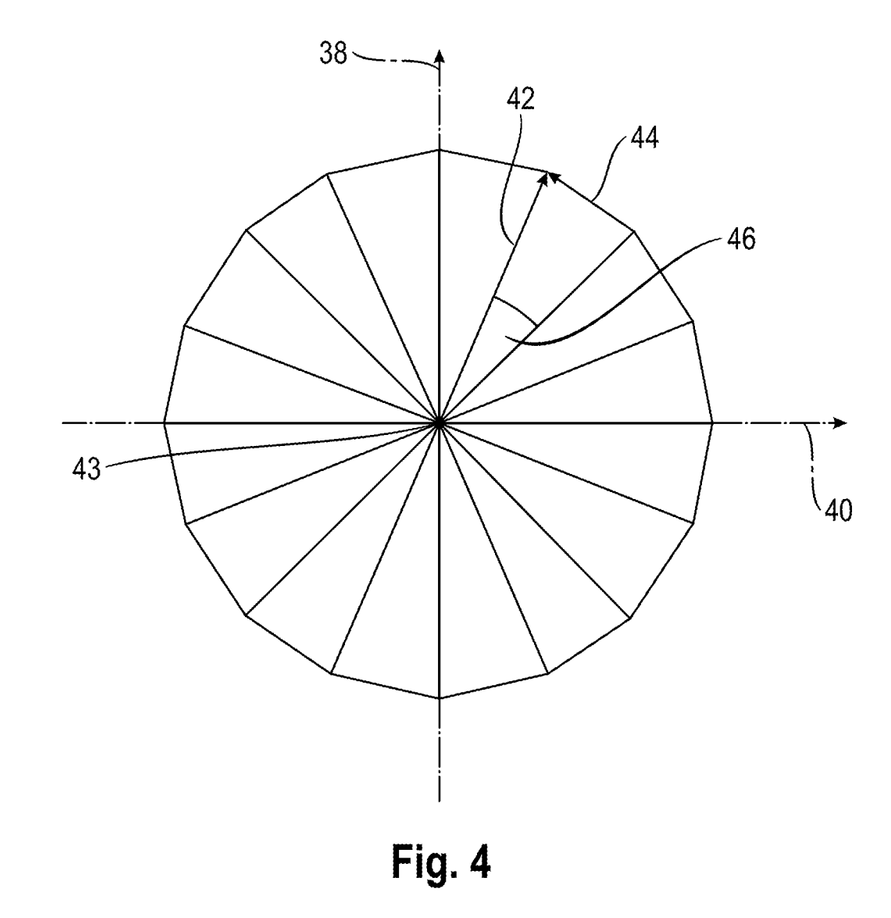
FIG. 4 shows a graph that illustrates the formation of a differential voltage using vectors.

The polyphase system can be used to increase the number of phases in a simple manner. This involves connecting up the windings of the electric machine as what is known as a star circuit and operating the modular multilevel converter 10 as an n-gonal circuit or ring circuit. In this case, a terminal of the windings of the electric machine is electrically connected to a respective phase terminal 14 of the multilevel converter 10. FIG. 4 shows a schematic representation of the voltages involved, an imaginary part 38 being mapped along the ordinate and a real part 40 of the voltages being mapped along the abscissa. In FIG. 4, the voltage present on a winding of the electric machine is denoted by 42 and the voltage provided by a phase terminal 14 is denoted by 44. In the prior art, the electric machine always operates against the star point 43, which means that there is always a large voltage difference between the voltage 42 on the winding and the star point 43. Further, the profile of the voltages on different windings is phase shifted, in the case of a three-phase system through a phase angle 46 of 120°, which means that the voltage difference between two windings may also be large. The polyphase system, particularly as a result of the use of a modular multilevel converter 10 having individual modules 12 arranged in a ring, can now be used to directly present and provide the voltage difference between two adjacent phase sections or windings of the electric machine. If the number of phases is increased, then the voltage 42 on the windings remains constant, but the phase voltage 44 falls linearly. For conventional power electronic circuits, this correlation was irrelevant, since inverters of the prior art always produce the respective phase voltages against a reference potential, for example the terminals of a DC link capacitor, and cannot form voltage differences between two windings. However, the voltage differences can be produced directly by the modular multilevel converter 10. The use of an n-phase system, that is to say a system having a large (more than 3) number of phases (particularly in the case of the electric machine), in which load (electric machine) and source (modular multilevel converter) are connected up differently (electric machine in a star circuit, modular multilevel converter in an n-gonal or ring circuit) allows the additional phases to be produced with a very low voltage. The very low voltage can be produced using a small number of individual modules 12 in a phase module 20. Normally, a phase module 20 has at least two individual modules 12.

If the modular multilevel converter 10 has three phase terminals 14, for example, then the converter operates in a known delta circuit. The complexity for adding a further phase consists merely in the addition of an additional tap 14. In this case, the current loading on the individual modules 12 remains constant in a first approximation when the drive power is the same. At the same time, however, the average current intensity per phase of the electric machine falls inversely linearly with the number of phases. Since the voltage difference between the windings is now provided directly by the converter 10, the voltage on the winding is now no longer referenced to the star point 43, but rather is referenced to an adjacent winding. The star point 43 is therefore a degree of freedom in a closed-loop control algorithm and can be implemented as a secondary condition in the closed-loop control algorithm of the converter.

Figure 5:
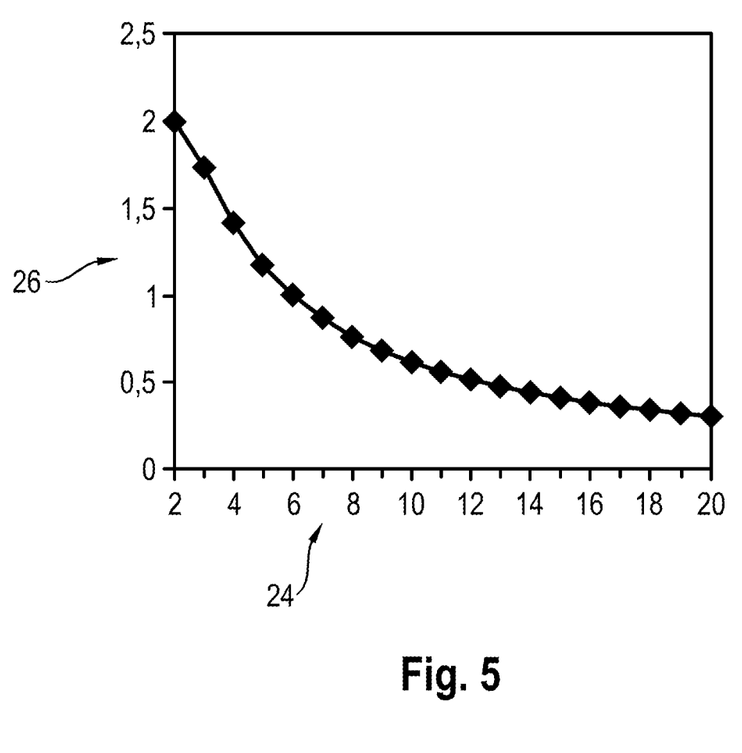
FIG. 5 shows a graph that illustrates the effect of an increase in the number of phases on the voltage of a phase.

As a result of the increase in the number of phases, the phase voltage in the converter is reduced, as mentioned. FIG. 5 shows a schematic profile of the reduction in the phase voltage. The phase voltage 26 is presented along the ordinate axis and the number 24 of phases is presented along the abscissa axis. From the curve, it can clearly be seen that as the number 24 of phases is increased, the phase voltage 26 decreases continuously. This allows very fine control of the magnetic induction in the electric machine. In this case, control can be effected by means of the harmonics or by means of a torque profile. In the case of control by means of the torque profile, it is also possible to eliminate vibrations in the machine.

The higher waveform quality of the polyphase system with the modular multilevel converter means that there are no further sharp voltage edges, which are customary with conventional drive converters on account of the rapid changeover between the maximum levels. These sharp edges that now disappear are a central reason for insulation destruction, however, which is the main cause of aging in electric machines. The now reduced insulation loading means that the voltage can be increased with the same insulation, as a result of which firstly a motor power density and secondly the lifetime, for example, are increased.

Further, the field weakening range of the motor can be avoided or shifted to higher speeds. The field weakening range is the range in which increasing the frequency of the output voltage does not increase the speed of the motor. The opportunity to avoid the additional field weakening current increases the efficiency of the overall system in wide operating ranges significantly and increases closed-loop control stability.

Figure 6:
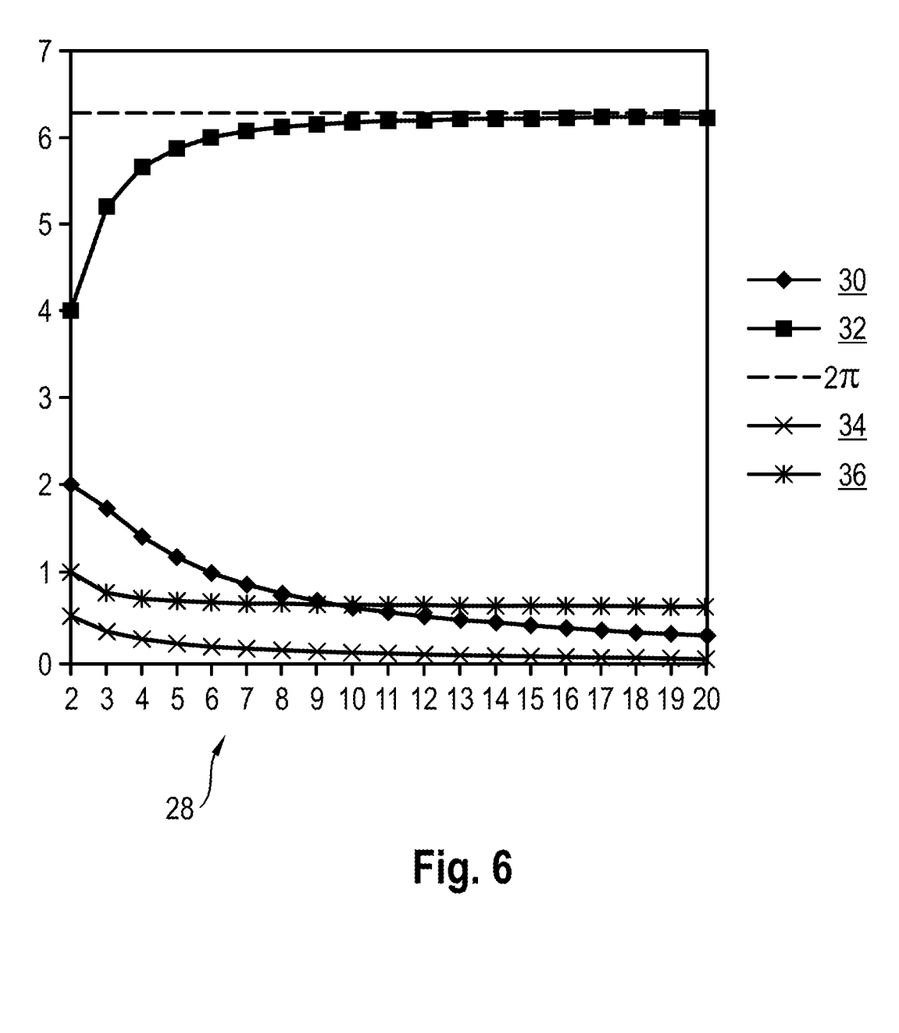
FIG. 6 shows a graph that illustrates the effects on different parameters when the number of phases is increased.

FIG. 6 schematically shows effects on further parameters when the number 28 of phases is increased. The number 28 of phases is plotted along the abscissa axis. In this case, the ordinate axis shows not absolute values but rather values normalized to a respective reference value, so that only ratios are presented. The curve 30 shows the profile of the differential voltage between the respective adjacent phases. It can clearly be seen that when the number 28 of phases is increased, the differential voltage decreases continuously. The curve 32 describes the number of phase modules, reference symbol 20 in FIGS. 1 and 2, that is used when the number 28 of phases is increased. The curve 34 describes the current per phase of the motor, that is to say of a winding, when the number 28 of phases is increased. In this case, it can be seen that the current initially decreases to a greater extent when the number of phases 28 is increased, and barely decreases further in the event of an increase when there is a large number of phases 28. The same applies to the current per individual module, reference symbol 12 in FIGS. 1 and 2, which is shown in curve 36. In this case, it can be seen that the current per module approaches a limit value.

Figure 2:
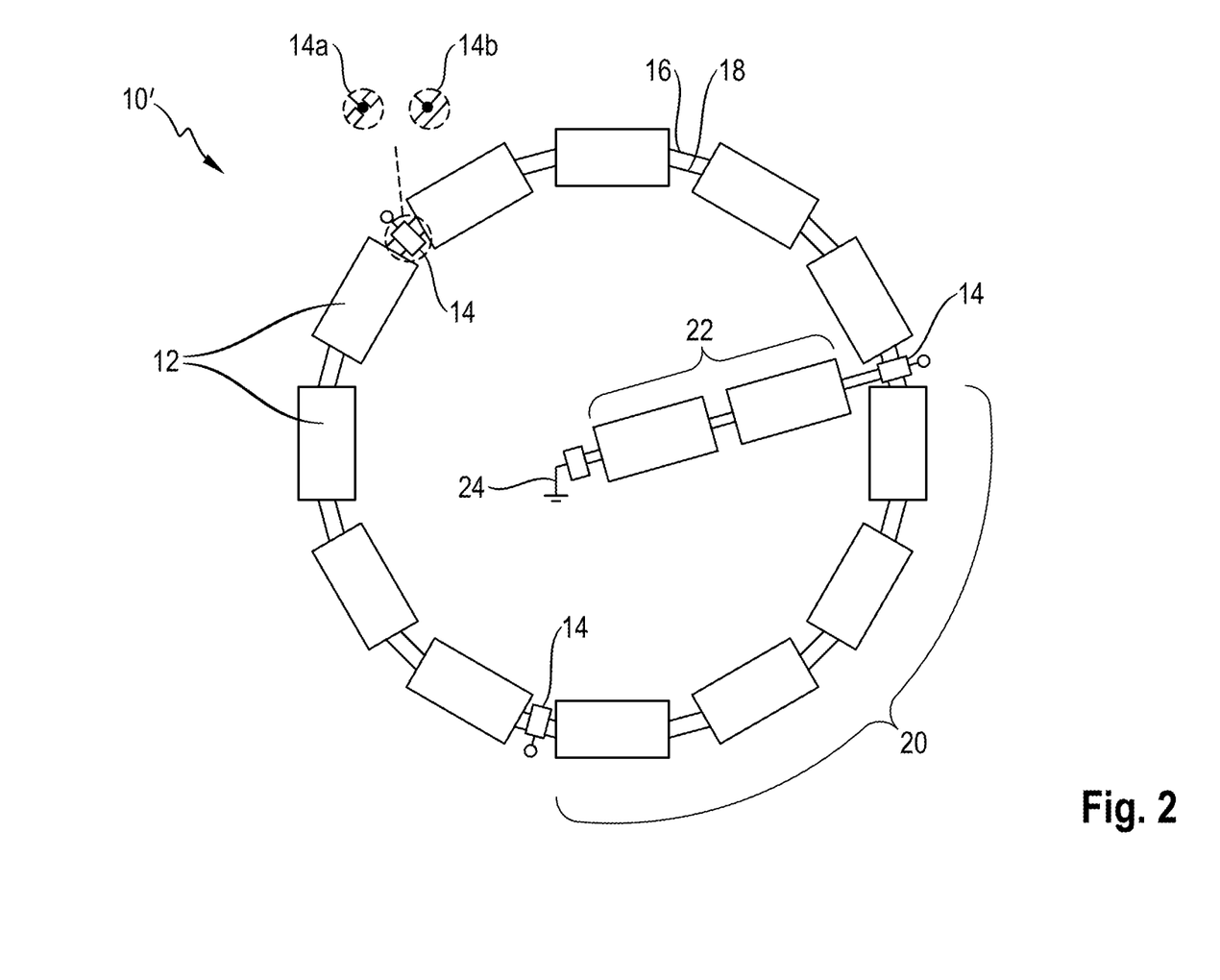
FIG. 2 shows a schematic view of a further exemplary macrotopology of a usable modular multilevel converter that has an additional phase module.

FIG. 2 shows a further embodiment of a modular multilevel converter 10' for use in a polyphase system. In this case, the modular multilevel converter 10' has an additional phase module 22. The additional phase module 22 has at least two individual modules 12. The additional phase module 22 is connected to a tap 14 and actively produces a voltage reference to a reference point or reference potential 24. This serves to ensure that a high voltage system in vehicles is at zero potential. Normally, high voltage systems in vehicles are of zero-potential, i.e. DC-isolated, for example from a bodywork of the vehicle and also from all other low voltage components, design. Zero potential increases protection in the event of a fault. Should an arbitrary conductor from the high voltage system be directly or indirectly touchable, for example connected to the bodywork, then no ongoing current flows. If the modular multilevel converter 10', which operates as a flexible multiphase battery, is connected to one or more loads, for example the electric machine, obtaining zero potential may require a virtual star point to be produced by means of suitable regulation of the phase currents in relation to one another. If a fixed reference potential is intended to be produced, however, then this can be accomplished in at least two ways. First, one or more points dividing the ring as symmetrically as possible can be connected to the relevant reference potential via impedances (resistors, inductances and assorted inductive/resistive elements). In this case, the choice of the impedance is a compromise between power losses as a result of current flow through the impedances and excessive drift relative to the reference potential. Instead of passive elements of this kind such as impedances, it is likewise possible for an additional phase module 22, as mentioned, to produce the voltage reference to the reference potential 24. In FIG. 2, the reference potential 24 is a ground. Any other desired reference potential is likewise conceivable, however. In contrast to the alternative with impedances, it is possible for phase modules 22 to provide high equalization currents in order to prevent a large drift relative to the reference potential.

Furthermore, the embodiment of the modular multilevel converter 10' shown in FIG. 2 has a plurality of individual modules 12 that are connected up to one another to form a ring. In this case, the individual modules 12 are connected to one another via two electrical conductors 16, 18. At least two of the individual modules 12 form a phase module. Arranged between two adjacent individual modules 12 are taps 14 in order to produce a phase terminal. In this case, both electrical conductors 16, 18 can be brought together in order to form a terminal 14a. Alternatively, a terminal 14b is merely arranged on one electrical conductor 16, 18.

The polyphase system can be used to cover all three typical cases of phase damage in electric machines in a failsafe manner. First, insulation faults that result in a more or less conductive connection of two phases can be avoided. To this end, the modular multilevel converter can firstly effectively disconnect the relevant phases by virtue of the current in these phases being regulated to zero (as a secondary condition of closed-loop control) by suitable voltage profiles. Secondly, the modular multilevel converter can, given sufficient information about the location of the interphase short, control or regulate the voltage between the two undesirably connected points of the two phases and hence the flow of current between the two phases to zero. Such prevention of a flow of current via the interphase short can prevent this only moderately conductive connection from heating. If the two connecting points of the interphase short divide the respective phases in the same ratio, then the solution consists in exact parallel operation of the two phases.

Further, insulation faults within a phase that result in a conductive connection between different turns can be avoided, so that a portion of the current does not flow through the whole turn but rather "takes a short cut" on the way. Furthermore, the loss of a phase, for example on account of a burnt-through or ruptured connection or an oxidized connecting point, can be avoided. For the latter two faults, affected phases can be disconnected by minimizing or regulating to zero the current in these phases or the voltage for the normally not directly accessible star point.

The higher the number of phases in the polyphase system, the more residual power and the less torque ripple the electric machine is able to provide in the event of failure of an individual phase. As a result, the electric machine runs more smoothly. The electric machine can cope with at least as many phase failures as mean that there is still at least one functioning phase in each 120° sector. In this case, the possibility of starting up the electric machine should also be provided in general.

Torque ripple and uneven torque are based on harmonics, which are produced to a high degree by ordinary electric machines and the ordinary inverters thereof. On the machine, these are caused by opposing voltages that are not induced perfectly sinusoidally. In the case of the stator of the electric machine, the causes are the determined poles and pole shoe edge effects. In the case of the rotor, the causes are spatial pole extent, saturation effects, air pockets and mechanical structures for strength, so that the opposing voltages are not induced perfectly sinusoidally. On the inverter, the causes are changeover between few fixed voltage levels by means of switching modulation, such as pulse width modulation, phase gating modulation, block commutation, etc. The many phases of the polyphase system permit very accurate spatial control over the magnetic field in the air gap at almost any point between 0 and $2\pi$, however. The high dynamic range of the polyphase system on account of the multilevel converter, which is approximately the same as the dynamic range of the sum of all the individual modules, further allows very accurate control over the temporal profile of the magnetic field in the air gap. This allows precise control over the field conditions at any location in the air gap at any time with a dynamic range at hitherto unknown levels. Furthermore, there is the opportunity to produce harmonics for the rotor during idling in the stator winding with very high precision in order to compensate for torque ripple or fluctuations. Precise production of the spatial (on account of the many phases) and temporal (on account of the unbeatably high dynamic range of the multilevel converter) field profile also allows the decrease in the torque ripple to be used as a regulatory aim for a closed-loop control algorithm.

Iron losses form the second most important category of loss in most electric machines besides copper losses (resistive line losses in the windings). The level of iron losses increases with the frequency of the magnetic field that suffuses the respective location in the iron. Besides a reduction in the torque ripple, it is also possible, for a given speed, to perform minimization particularly in the iron components having the highest field strengths of the magnetic fields through suitable distortion (consequently a deviation from a sinusoidal current profile) of the currents in the individual phases, so that small iron losses arise in these iron components.

Furthermore, it will be mentioned that it is also possible to operate an electrical polyphase system in which the windings of the electric machine are connected up to one another to form a ring (that is to say to form an n-gonal circuit) and the phase modules 20 of the modular multilevel converter 10, 10' are connected up to form a star circuit. In this way, the modular multilevel converter 10, 10' provides the full voltage of the phase modules, the star point being fixed. The windings of the electric machine now see only the voltage difference in relation to an adjacent winding and can therefore be provided with smaller dimensions. In this way, the currents in the windings can flow in the loop, as a result of which a time profile for the ring currents can also be included in the closed-loop control as a secondary condition. It is also possible to produce different levels of currents in the loop.

What is claimed is:

1. A modular multilevel converter comprising:
at least one control unit;
a plurality of individual modules that each have a plurality of switching elements controlled by the at least one control unit and at least one electrical energy store, wherein the plurality of individual modules are connected together in succession to form a closed ring, each of the plurality of individual modules configurable by the at least one control unit between at least a bypass connection and a series connection with an adjacent module by the plurality of switching elements allowing energy stores of adjacent individual modules to be selectively connected together; and
at least four phase terminals on the dosed ring, each phase terminal connected between respective adjacent individual modules of the dosed ring and separated from an adjacent phase terminal by at least two individual modules of the closed ring, wherein a voltage difference between two adjacent phase terminals of the closed ring is regulated by the at least one control unit configuring the plurality of individual modules.

2. The modular multilevel converter as claimed in claim 1, in which each of at least four taps are arranged between two respective adjacent individual modules to provide the at least four phase terminals.

3. The modular multilevel converter as claimed in claim 1, in which the modular multilevel converter has a phase module comprising at least two individual modules that branches off from the ring and that has one end connected to a tap and has the other end connected to a reference potential.

4. The modular multilevel converter as claimed in claim 1, in which at least one tap is connected to a reference potential via an electrical connection that has at least one electrical resistance, an inductance or both at least one electrical resistance and an inductance.

5. The modular multilevel converter as claimed in claim 1, in which the switching elements of the multiplicity of individual modules are low-voltage semiconductor switching elements.

6. An electrical polyphase system comprising:
an electric machine that has a multiplicity of windings having a first terminal and a second terminal,
at least one node to which either the first or the second terminal of a respective winding from the multiplicity of windings is electrically connected, and the corresponding other terminal of the first and second terminals of a respective winding from the multiplicity of windings is electrically connected to a phase terminal, and
the modular multilevel converter of claim 1, wherein at least one tap is arranged between two respective adjacent individual modules of the plurality of modules and provides a phase terminal to which the first or the second terminal of a winding from the multiplicity of windings of the electric machine is electrically connected,
wherein a number of taps of the modular multilevel converter corresponds exactly to a number of windings from the multiplicity of windings of the electric machine.

7. The electrical polyphase system as claimed in claim 6, in which the electric machine operates as a generator or as a motor.

8. The converter of claim 1, wherein the individual modules are additionally configurable by the control unit in at least one of a disconnection or a parallel connection with the adjacent module by the plurality of switching elements.

9. The modular multilevel converter as claimed in claim 2, in which each of the individual modules have a first side and a second side, the first side having two terminals and the second side having two terminals.

10. The modular multilevel converter as claimed in claim 9, in which the individual modules are each electrically connected to one another by two electrical conductors.

11. The modular multilevel converter as claimed in claim 10, in which the tap for providing a phase terminal is arranged on one of the two electrical conductors.

12. The modular multilevel converter as claimed in claim 10, in which the tap for providing a phase terminal is arranged on both electrical conductors.

* * * * *

UNITED STATES PATENT AND TRADEMARK OFFICE
CERTIFICATE OF CORRECTION

PATENT NO.         : 10,454,331 B2
APPLICATION NO.    : 15/368788
DATED              : October 22, 2019
INVENTOR(S)        : Stefan Götz It is certified that error appears in the above-identified patent and that said Letters Patent is hereby corrected as shown below:

In the Claims

At Column 12, Line 5, In Claim 1, "the dosed ring" should read --the closed ring--.

At Column 12, Line 7, In Claim 1, "the dosed ring" should read --the closed ring--.

Signed and Sealed this
Fourteenth Day of January, 2020

Andrei Iancu
*Director of the United States Patent and Trademark Office*